US009829717B1

(12) United States Patent
Walsh (10) Patent No.: US 9,829,717 B1
(45) Date of Patent: Nov. 28, 2017

(54) PANCHARATNAM-BERRY OPTICAL ELEMENT/DIFFRACTIVE WAVEPLATE ANGULAR MOMENTUM SORTER

(71) Applicant: The United States of America as Represented by the Secretary of the Army, Washington, DC (US)

(72) Inventor: Gary Walsh, Needham, MA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/173,770

(22) Filed: Jun. 6, 2016

Related U.S. Application Data

(60) Provisional application No. 62/181,274, filed on Jun. 18, 2015.

(51) Int. Cl.
*G02B 5/30* (2006.01)
*G02B 27/42* (2006.01)
*G02B 5/18* (2006.01)

(52) U.S. Cl.
CPC ....... *G02B 27/4261* (2013.01); *G02B 5/1876* (2013.01); *G02B 5/3083* (2013.01); *G02B 27/4266* (2013.01); *G02B 27/4277* (2013.01)

(58) Field of Classification Search
CPC .............. G02B 27/4261; G02B 5/1876; G02B 5/3083; G02B 27/4266; G02B 27/4277
USPC ............ 359/483.01, 484.01, 486.01, 486.03, 359/489.07, 563, 569
See application file for complete search history.

(56) References Cited

U.S. PATENT DOCUMENTS

| 2005/0259914 | A1 | 11/2005 | Padgett et al. | |
|---|---|---|---|---|
| 2006/0126183 | A1* | 6/2006 | Hasman | G02B 5/1809 359/573 |
| 2009/0194702 | A1* | 8/2009 | Meyers | H04L 9/0858 250/393 |
| 2010/0141939 | A1* | 6/2010 | Zhan | B82Y 20/00 356/301 |
| 2016/0011353 | A1* | 1/2016 | Escuti | G02B 27/283 359/15 |

(Continued)

FOREIGN PATENT DOCUMENTS

GB     EP 2019497 A1 * 1/2009 ........... G02F 1/0136

OTHER PUBLICATIONS

J. Leach, M. J. Padgett, S. M. Barnett, S. Franke-Arnold, and J. Courtial, "Measuring the orbital angular momentum of a single photon," Phys. Rev. Lett. 88(25), 257901 (2002).

(Continued)

*Primary Examiner* — Frank Font
(74) *Attorney, Agent, or Firm* — Roger C Phillips (57) ABSTRACT

An apparatus for sorting orbital angular momentum eigenstates of one or more photons includes at least one transformation PBOE configured to sort orbital angular momentum eigenstates of the one or more photons, at least one phase correction PBOE configured to sort spin angular momentum eigenstates of the one or more photons. A method for sorting orbital angular momentum eigenstates of one or more photons includes using at least one transformation PBOE to sort orbital angular momentum eigenstates of the one or more photons, and using at least one phase correction PBOE to sort spin angular momentum eigenstates of the one or more photons.

20 Claims, 9 Drawing Sheets

(56) References Cited

U.S. PATENT DOCUMENTS

| | | | |
|---|---|---|---|
| 2016/0025914 A1* | 1/2016 | Brongersma | G02B 1/002 359/489.07 |
| 2016/0033406 A1* | 2/2016 | Ashrafi | G01N 21/17 356/432 |
| 2016/0202283 A1* | 7/2016 | Wang | B64D 45/00 356/28 |

OTHER PUBLICATIONS

J. Wang, J. Y. Yang, I. F. Fazal, N. Ahmed, Y. Yan, H. Huang, Y. Ren, Y. Yue, S. Dolinar, M. Tur, and A. E. Willner, "Terabit free-space data transmission employing orbital angular momentum multiplexing," Nat. Photonics 6(7), 488-496 (2012).
H. Huang, G. Xie, Y. Yan, N. Ahmed, Y. Ren, Y. Yue, D. Rogawski, M. J. Willner, B. I. Erkmen, K. M. Birnbaum, S. J. Dolinar, M. P. J. Lavery, M. J. Padgett, M. Tur, and A. E. Willner, "100 Tbit/s free-space data link enabled by three-dimensional multiplexing of orbital angular momentum, polarization, and wavelength," Opt. Lett. 39(2), 197-200 (2014).
N. Bozinovic, Y. Yue, Y. Ren, M. Tur, P. Kristensen, H. Huang, A. E. Willner, and S. Ramachandran, "Terabitscale orbital angular momentum mode division multiplexing in fibers," Science 340(6140), 1545-1548 (2013).
A. E. Willner, H. Huang, Y. Yen, Y. Ren, N. Ahmed, G. Xie, C. Bao, L. Li, Y. Cao, Z. Zhao, J. Wang, M. P. J. Lavery, M. Tur, S. Ramachandran, A. F. Molisch, N. Ashrafi, and S. Ashrafi, "Optical communications using orbital angular momentum beams," Adv. Opt. Photonics 7(1), 66-106 (2015).
G. Molina-Terriza, J. P. Torres, and L. Torner, "Management of the angular momentum of light: preparation of photons in multidimensional vector states of angular momentum," Phys. Rev. Lett. 88(1), 013601 (2001).
A. Vaziri, G. Weihs, and A. Zeilinger, "Experimental two-photon, three-dimensional entanglement for quantum communication," Phys. Rev. Lett. 89(24), 240401 (2002).
G. C. G. Berkhout, M. P. J. Lavery, J. Courtial, M. W. Beijersbergen, and M. J. Padgett, "Efficient sorting of orbital angular momentum states of light," Phys. Rev. Lett. 105(15), 153601 (2010).
M. P. J. Lavery, D. J. Robertson, G. C. G. Berkhout, G. D. Love, M. J. Padgett, and J. Courtial, "Refractive elements for the measurement of the orbital angular momentum of a single photon," Opt. Express 20(3), 2110-2115 (2012).
L. Marrucci, C. Manzo, and D. Paparo, "Pancharatnam-Berry phase optical elements for wave front shaping in the visible domain: switchable hylical modes generation," Appl. Phys. Lett. 88(22), 221102 (2006).
Z. Bomzon, G. Biener, V. Kleiner, and E. Hasman, "Space-variant Pancharatnam-Berry phase optical elements with computer-generated subwavelength gratings," Opt. Lett. 27(13), 1141-1143 (2002).
C. Provenzano, P. Pagliusi, and G. Cipparrone, "Highly efficient liquid crystal based diffraction grating induced by polarization holograms at the aligning surfaces," Appl. Phys. Lett. 89(12), 121105 (2006).
S. Slussarenko, B. Piccirillo, V. Chigrinov, L. Marrucci, and E. Santamato, "Liquid crystal spatial-mode converters for the orbital angular momentum of light," J. Opt. 15(2), 025406 (2013).
S. R. Nersisyan, N. V. Tabiryan, D. M. Steeves, and B. R. Kimball, "The promise of diffractive waveplates," Opt. Photonics News 21(3), 40-45 (2010).
S. R. Nersisyan, N. V. Tabiryan, D. Mawet, and E. Serabyn, "Improving vector vortex waveplates for high contrast coronagraphy," Opt. Express 21(7), 8205-8213 (2013).
S. Nersisyan, N. Tabiryan, D. M. Steeves, and B. R. Kimball, "Fabrication of liquid crystal polymer axial waveplates for UV-IR wavelengths," Opt. Express 17(14), 11926-11934 (2009).
H. Sarkissian, S. V. Serak, N. V. Tabiryan, L. B. Glebov, V. Rotar, and B. Y. Zeldovich, "Polarization controlled switching between diffraction orders in transverse-periodically aligned nematic liquid crystals," Opt. Lett. 31(15), 2248-2250 (2006).
L. Goldenberg, V. Lisinetskii, A. Ryabchun, A. Bobrovsky, and S. Schrader, "Liquid crystalline azobenzene containing polymer as a matrix for distributed feedback lasers," ACS Photonics 1(9), 885-893 (2014).
A. Niv, G. Biener, V. Kleiner, and E. Hasman, "Manipulation of the Pancharatnam phase in vectorial vortices," Opt. Express 14(10), 4208-4220 (2006).
D. Lin, P. Fan, E. Hasman, and M. L. Brongersma, "Dielectric gradient metasurface optical elements," Science 345(6194), 298-302 (2014).
A. Niv, G. Biener, V. Kleiner, and E. Hasman, "Rotating vectorial vortices produced by space-variant subwavelength gratings," Opt. Lett. 30(21), 2933-2935 (2005).
N. Yu, P. Genevet, M. A. Kats, F. Aieta, J. P. Tetienne, F. Capasso, and Z. Gaburro, "Light propagation with phase discontinuities: generalized laws of reflection and refraction," Science 334(6054), 333-337 (2011).
F. Aieta, P. Genevet, M. A. Kats, N. Yu, R. Blanchard, Z. Gaburro, and F. Capasso, "Aberration-free ultrathin flat lenses and axicons at telecom wavelengths based on plasmonic metasurfaces," Nano Lett. 12(9), 4932-4936 (2012).
M. Malik, M. Mirhosseini, M. P. J. Lavery, J. Leach, M. J. Padgett, and R. W. Boyd, "Direct measurement of a 27-dimensional orbital-angular-momentum state vector," Nat. Commun. 5,3115 (2014).
J. Cederquist and A. M. Tai, "Computer-generated holograms for geometric transformations," Appl. Opt. 23(18), 3099-3104 (1984).
P. Pagliusi, C. Provenzano, A. Mazzulla, L. Giorgini, and G. Cipparrone, "Spectrograph based on a single diffractive element for real-time measurement of circular dichroism," Appl. Spectrosc. 62(5), 465-468 (2008).
O. Bryngdahl, "Geometrical transformations in optics," J. Opt. Soc. Am. 64(8), 1092-1099 (1974).
T. C. Poon and T. Kim, Engineering Optics with MATLAB (World Scientific Publishing Co., 2006), Ch. 3.
M. N. O'Sullivan, M. Mirhosseini, M. Malik, and R. W. Boyd, "Near-perfect sorting of orbital angular momentum and angular position states of light," Opt. Express 20(22), 24444-24449 (2012).
M. Mirhosseini, M. Malik, Z. Shi, and R. W. Boyd, "Efficient separation of the orbital angular momentum eigenstates of light," Nat. Commun. 4,2781 (2013).
L. Marrucci, C. Manzo, and D. Paparo, "Optical spin-to-orbital angular momentum conversion in inhomogeneous anisotropic media," Phys. Rev. Lett. 96(16), 163905 (2006).
S. Ramachadran and P. Kristensen, "Optical vortices in fiber," Nanophotonics 2(5-6), 455-474 (2013).
B. E. A. Saleh and M. C. Teich, Fundamentals of Photonics Second Edition (John Wiley and Sons, 2007), Ch. 3.
M. J. Padgett and J. Courtial, "Poincare-sphere equivalent for light beams containing orbital angular momentum," Opt. Lett. 24(7), 430-432 (1999).
G. Milione, M. P. J. Lavery, H. Huang, Y. Ren, G. Xie, T. A. Nguyen, E. Karimi, L. Marrucci, D. A. Nolan, R. R. Alfano, and A. E. Willner, "4×20 Gbit/s mode division multiplexing over free space using vector modes and a q-plate mode (de)multiplexer," Opt. Lett. 40(9), 1980-1983 (2015).
L. Novotny and B. Hecht, Principles of Nano-Optics (Cambridge University Press, 2006), Ch. 3.
S. Golowich, N. Bozinovic, P. Kristensen, and S. Ramachandran, "Complex mode amplitude measurement for a six-mode optical fiber," Opt. Express 21(4), 4931-4944 (2013).
D. L. Andrews, Structured Light and Its Applications: An Introduction to Phase-Structured Beams and Nanoscale Optical Forces (Academic Press, 2008).
N. Lawrence, J. Trevino, and L. D. Negro, "Control of optical orbital angular momentum by Vogel spiral arrays of metallic nanoparticles," Opt. Lett. 37(24), 5076-5078 (2012).
F. K. Fatemi and G. Beadle, "Rapid complex mode decomposition of vector beams by common path interferometry," Opt. Express 21(26), 32291-32305 (2013).

* cited by examiner

PANCHARATNAM-BERRY OPTICAL ELEMENT/DIFFRACTIVE WAVEPLATE ANGULAR MOMENTUM SORTER

STATEMENT OF GOVERNMENT INTEREST

The embodiments described herein may be manufactured and used by or for the U.S. Government for governmental purposes without the payment of any royalties thereon or therefor.

FIELD

The disclosed embodiments relate in general to an optical sorting system, and more particularly to sorting orbital angular momentum and spin angular momentum states of a photon or optical beam.

BACKGROUND

Previous approaches for sorting orbital angular momentum (OAM) used a cascading series of Mach-Zehnder interferometers as disclosed by Leach, J., Padgett, M. J., Franke-Arnold, S., & Courtial, J. (2002), "Measring the Orbital Angular Momentum of a Single Photon", *Phys. Rev. Lett.*, 88, 257901, and also disclosed in United States Patent Application No. 2005/0259914. This implementation was large, expensive, and unstable due to the required alignment precision. Recently a highly efficient OAM sorting method was developed utilizing an optical geometric transform which converts helical phase into a linear phase gradient as disclosed by Berkhout, G. C., Lavery, M. P., Courtial, J., Beijersbergen, M. W., & Padgett, M. J. (2010), "Efficient sorting of orbital angular momentum states of light", *Phys. Rev. Lett.*, 105, 153601. The method has been demonstrated with both diffractive elements as disclosed by Berkhout et al. and refractive elements as disclosed by M. P. J. Lavery, D. J. (2012), "Refractive element for the measurement of the orbital angular momentum of a signle photon", *Optics Express*, vol. 20, no. 3, 2110-2115. This scheme solved the size and stability issues as two complex elements in an easily aligned 4-f imaging system can in principle sort an infinite number of OAM states; however, these elements must be individually diamond machined with a 3 axis ultra-precision lathe.

An OAM sorting element that can be quickly and inexpensively replicated would be advantageous.

SUMMARY

The disclosed embodiments provide for devices including one or more Pancharatnam-Berry Optical Elements (PBOE) that sort the angular momentum states of a photon or optical beam. PBOEs, also known as Diffractive Waveplates, and Geometrical Phase Optical Elements, are half-wave phase retarders with continuous transversely varying structure of the anisotropic optical axis. A PBOE may be constructed of a photoresponsive material thin film, capable of producing an internal structure aligned according to a polarization pattern, deposited on a substrate. Non-limiting examples of photoresponsive materials may include photoanisotropic materials such as azobenzene or azobenzene dye-doped polymers, and photoalignment materials such as azobenzene derivatives, cinnamic acid derivatives, and coumarine derivatives. Photoresponsive materials may be used in conjunction with other anisotropic materials. Non-limiting examples of anisotropic materials may include liquid crystals and liquid crystal derived polymers. The quantum state of a photon or optical beam includes a quantized orbital angular momentum (OAM) and spin angular momentum (SAM/polarization) state. The disclosed embodiments are generally directed to any combination of PBOEs in an optical system that sorts at least the OAM state of a photon or optical beam.

The disclosed embodiments may sort both the OAM and SAM eigenstates of a photon or optical beam simultaneously. The disclosed embodiments provide a reduction in size and number of elements as opposed to current technology, and also allow for characterization of the modal composition of laser cavity and fiber optic outputs in a single measurement. The embodiments disclosed herein may also be rapidly manufactured by holographic photoalignment, thus representing an improvement over present manufacturing technology. The disclosed embodiments may advantageously be relatively thin and light weight representing a reduction in size and weight over present implementations. As a non-limiting example, the one or more Pancharatnam-Berry Optical Elements (PBOE) may have a thickness on the order of approximately 1 micron.

In at least one aspect of the disclosed embodiments, an apparatus for sorting orbital angular momentum eigenstates of one or more photons includes at least one transformation and at least one phase correction PBOE configured to sort orbital angular momentum eigenstates of the one or more photons, and spin angular momentum eigenstates of the one or more photons.

The one or more photons may make up an optical beam.

The at least one transformation PBOE and the at least one phase correction PBOE may include an anisotropic thin film element.

The transformation and phase correction PBOEs may have complementary slow-axis orientation patterns that together form a ring to point geometric optical transformation that sorts the angular momentum eigenstates of the one or more photons.

The at least one transformation PBOE may include a first transversely varying slow-axis orientation pattern.

The first transversely varying slow-axis orientation pattern may be implemented using the function:

$$\alpha_1(x, y) = \frac{\pi a}{\lambda f}\left(y\tan^{-1}\left(\frac{y}{x}\right) - x\ln\left(\frac{\sqrt{x^2 + y^2}}{b}\right) + x\right),$$

where f is the focal length of lenses in the 4-f imaging system.

The at least one phase correction PBOE may include a second transversely varying slow-axis orientation pattern.

The second transversely varying slow-axis orientation pattern may be implemented using the function:

$$\alpha_2(x, y) = \frac{\pi}{\Lambda}x + \frac{\pi ab}{\lambda f}\begin{cases}(-1)\exp\left(-\frac{x}{a}\right)\cos\left(\frac{y}{a}\right); & x \geq 0 \\ (+1)\exp\left(+\frac{x}{a}\right)\cos\left(\frac{y}{a}\right); & x < 0\end{cases}$$

where f is the focal length of the lenses in the 4-f imaging system, and $\Lambda$ determines the spacing between the sorted SAM eigenstates.

The second transversely varying slow-axis orientation pattern may be implemented using the function:

$$a_2(x, y) = \frac{\pi}{\Lambda}x + \frac{\pi ab}{\lambda f}\begin{cases} (-1)\exp\left(-\frac{x}{a}\right)\cos\left(\frac{y}{a}\right) + \frac{(x^2+y^2)}{2ab}; & x \geq 0 \\ (+1)\exp\left(+\frac{x}{a}\right)\cos\left(\frac{y}{a}\right) - \frac{(x^2+y^2)}{2ab}; & x < 0 \end{cases}$$

where f is the focal length of the lenses in the 4-f imaging system, and $\Lambda$ determines the spacing between the sorted SAM eigenstates.

The at least one transformation PBOE and the at least one phase correction PBOE may be arranged as a 4-f imaging system with the at least one transformation Pancharatnam-Berry Optical Element (PBOE) positioned in an object plane of the imaging system, the at least one phase correction PBOE positioned in a Fourier plane of the imaging system, and the sorted angular momentum eigenstates of the one or more photons appearing in an image plane of the imaging system.

In another aspect of the disclosed embodiments, a method for sorting orbital angular momentum eigenstates of one or more photons includes using at least one transformation PBOE and one phase correction PBOE to sort orbital angular momentum eigenstates of the one or more photons, and to sort spin angular momentum eigenstates of the one or more photons.

The one or more photons may make an optical beam.

The at least one transformation PBOE and the at least one phase correction PBOE may include an anisotropic thin film element.

Complementary slow-axis orientation patterns of the transformation and phase correction PBOEs together may form a ring to point geometric optical transformation that sorts the angular momentum eigenstates of the one or more photons.

The at least one transformation PBOE may include a first transversely varying slow-axis orientation pattern.

The method may include implementing the first transversely varying slow-axis orientation pattern using the function:

$$\alpha_1(x, y) = \frac{\pi a}{\lambda f}\left(y\tan^{-1}\left(\frac{y}{x}\right) - x\ln\left(\frac{\sqrt{x^2+y^2}}{b}\right) + x\right),$$

where f is the focal length of lenses in the 4-f imaging system.

The at least one phase correction PBOE may include a second transversely varying slow-axis orientation pattern.

The method may include implementing the second transversely varying slow-axis orientation pattern using the function:

$$\alpha_2(x, y) = \frac{\pi}{\Lambda}x + \frac{\pi ab}{\lambda f}\begin{cases} (-1)\exp\left(-\frac{x}{a}\right)\cos\left(\frac{y}{a}\right); & x \geq 0 \\ (+1)\exp\left(+\frac{x}{a}\right)\cos\left(\frac{y}{a}\right); & x < 0 \end{cases}$$

where f is the focal length of the lenses in the 4-f imaging system, and $\Lambda$ determines the spacing between the sorted SAM eigenstates.

The method may include implementing the second transversely varying slow-axis orientation pattern using the function:

$$\alpha_2(x, y) = \frac{\pi}{\Lambda}x + \frac{\pi ab}{\lambda f}\begin{cases} (-1)\exp\left(-\frac{x}{a}\right)\cos\left(\frac{y}{a}\right) + \frac{(x^2+y^2)}{2ab}; & x \geq 0 \\ (+1)\exp\left(+\frac{x}{a}\right)\cos\left(\frac{y}{a}\right) - \frac{(x^2+y^2)}{2ab}; & x < 0 \end{cases}$$

where f is the focal length of the lenses in the 4-f imaging system, and $\Lambda$ determines the spacing between the sorted SAM eigenstates.

The method may include arranging the at least one transformation PBOE and the at least one phase correction PBOE as a 4-f imaging system by positioning the at least one transformation Pancharatnam-Berry Optical Element (PBOE) in an object plane of the imaging system, positioning the at least one phase correction PBOE in a Fourier plane of the imaging system, and projecting the sorted angular momentum eigenstates of the one or more photons in an image plane of the imaging system.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the disclosed embodiments, for which reference should be made to the appended claims. Additional aspects and advantages of the disclosed embodiments will be set forth in the description that follows, and in part will be obvious from the description, or may be learned by practice of the disclosed embodiments. Moreover, the aspects and advantages of the disclosed embodiments may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

FIGS. 5a, 5a1-5a3, 5b, and 5b1-5b3 show intensity profiles for different Laguerre-Gaussian modes, and their corresponding sorted orbital and spin angular momentum eigenstates according to the disclosed embodiments;

FIGS. 5c and 5c1-5c3 show intensity profiles for different Hermite-Gaussian modes, and their corresponding sorted orbital and spin angular momentum eigenstates according to the disclosed embodiments;

FIGS. 9a1, 9b1, 9c1, and 9d1 show several complex structured beams composed of a superposition of Laguerre-Gaussian modes.

FIGS. 9a2, 9b2, 9c2, and 9d2 show outputs of the disclosed sorter for the complex structured beams shown in FIGS. 9a1, 9b1, 9c1, and 9d1, respectively.

DETAILED DESCRIPTION

Similar to elementary particles, photons possess two types of quantized angular momentum. SAM, commonly referred to as polarization, has two orthogonal eigenstates, namely, left-circular polarization $|L\rangle$, and right-circular polarization $|R\rangle$. Left and right refer to the direction in which the electric field vector rotates as the wave propagates. Additionally photons possess quantized values of OAM with a boundless set of possible eigenstates. OAM refers to the azimuthal phase of the wave. A beam with a topological phase dependence of $\exp(jl\phi)$, where $\phi$ is the polar angle on a plane perpendicular to the propagation direction, carries OAM of $l\hbar$ that is independent of the polarization. The integer l is known as the topological charge.

Berkhout et al. referred to above, demonstrated that spatially separating orthogonal OAM states can be accomplished by mapping the azimuthal phase of a beam into a linear phase gradient. This transforms OAM into linear momentum, producing a displacement of the beam when focused to a spot in an image plane. The topological charge of the vortex beam determines the spatial frequency of the linear phase gradient and therefore the spatial separation of the sorted OAM states. According to the disclosed embodiments, this process may be implemented with a ring-to-point geometric optical transformation using two complex optical elements in a 4-f imaging system. PBOE's are used to implement a similar transformation by modifying the PBOE's to simultaneously sort the SAM eigenstates taking advantage of their inherent circular polarization selective properties.

PBOEs are patterned half-waveplates that modulate the Pancharatnam (topological) phase of a beam by transversely varying the polarization rotation. A standard half-waveplate includes an aligned anisotropic material, which rotates the linear polarization vector by an angle $2\alpha$, where $\alpha$ is the angle between the slow-axis of the material and the polarization vector. When acting on a circularly polarized wave, this element inverts the SAM state. This mapping is mathematically represented with a rotation Jones matrix. If instead of being fixed at a constant angle, the slow axis orientation follows a transversely varying two-dimensional function $\alpha(x, y)$, then the polarization rotation changes across the wavefront. The two-dimensional polarization transform of PBOEs are characterized by a spatially varying rotation Jones matrix as disclosed by Marrucci, L., Manzo, C., & Paparo, D. (2006). "Pancharatnam-Berry phase optical elements for wavefront shaping in the visible domain: switchable hylical modes generation". *Appl. Phys. Lett.*, 221102.

Applying this matrix to an input wave in the $|L\rangle$ SAM eigenstate, $\vec{E}_o=E_o[1;j]$, the output becomes $|R\rangle$ and the wave front is modulated by the topological phase factor $\exp(j2\alpha(x, y))$, e.g. $\vec{E}=E_oM(x, y)[1;j]=E_o\exp(j2\alpha(x, y))[1;-j]$. Conversely, for a $|R\rangle$ input the output is $|L\rangle$ with a topological phase modulation $\exp(-j2\alpha(x, y))$. PBOEs are therefore thin, phase only optical elements which act separately on the two SAM eigenstates. This property allows us to construct an optical system that simultaneously sorts the OAM and SAM of an optical beam.

The ring-to-point geometric optical transform that sorts OAM maps $(x,y) \rightarrow (u,v)$, where $(x,y)$ and $(u,v)=(\alpha \tan^{-1}(y/x), -\alpha \ln((x^2+y^2)^{1/2}/b)$ are the Cartesian coordinates of the input and output planes, respectively, as disclosed by Cederquist, J., & Tai, A. M. (1984). Computer-generated holograms for geometric transformations, *Applied Optics*, 23(18), 3099-3104, and as disclosed by Berkhout et al. referred to above. The variables a and b scale and translate the transformed image in the Fourier plane of the 4-f system. This transformation can be implemented using PBOEs, which can additionally be adapted to simultaneously sort the SAM eigenstates. The two PBOEs are referred to as the transformation and phase correction elements and their transversely varying slow-axis orientation patterns are given by:

$$\alpha_1(x, y) = \frac{\pi a}{\lambda f}\left(y\tan^{-1}\left(\frac{y}{x}\right) - x\ln\left(\frac{\sqrt{x^2+y^2}}{b}\right) + x\right) \quad (1)$$

and $$\alpha_2(x, y) = \frac{\pi}{\Lambda}x + \frac{\pi ab}{\lambda f}\begin{cases}(-1)\exp\left(-\frac{x}{a}\right)\cos\left(\frac{y}{a}\right); & x \geq 0 \\ (+1)\exp\left(+\frac{x}{a}\right)\cos\left(\frac{y}{a}\right); & x < 0\end{cases} \quad (2)$$

respectively, where f is the focal length of the lenses in the 4-f imaging system, and $\Lambda$ determines the spacing between the sorted SAM eigenstates.

Figure 1A:
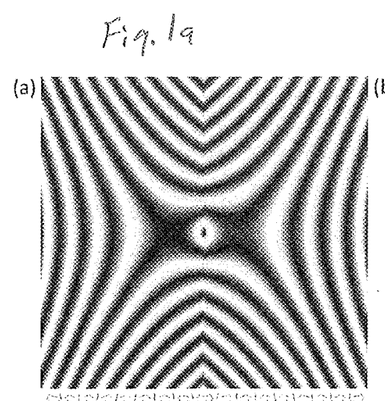
FIGS. 1a and 1b show example implementations of transformation and phase correction PBOEs according to the disclosed embodiments.
Figure 1B:
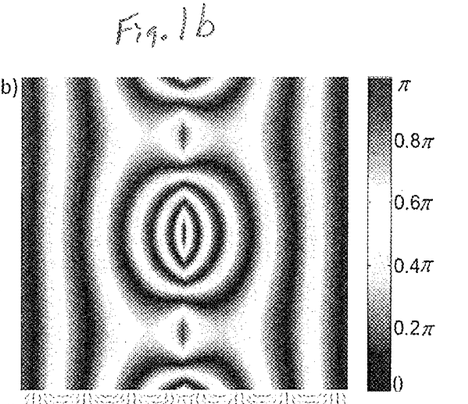
Figure 1C:
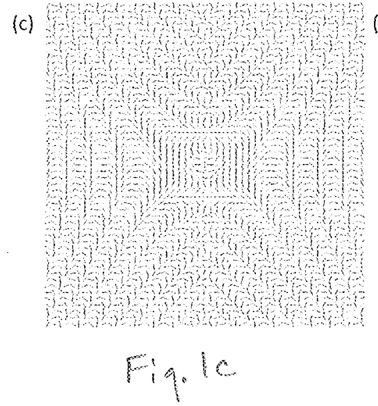
FIGS. 1c and 1d show two dimensional slow axis orientation maps of the transformation PBOE and phase correction PBOE, respectively.
Figure 1D:
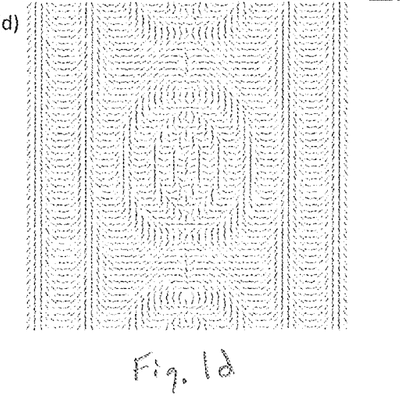

FIG. 1a shows the angle of an implementation of $\alpha_1(x, y)$, and FIG. 1b shows an example of a corresponding implementation of $\alpha_2(x, y)$. FIG. 1c shows a two dimensional slow axis orientation map of the transformation PBOE and FIG. 1d shows a two dimensional slow axis orientation map of the phase correction PBOE. FIGS. 1c and 1d further show the director patterns of the corresponding PBOEs, where each line segment indicates the local orientation of the slow axis.

Figure 2A:
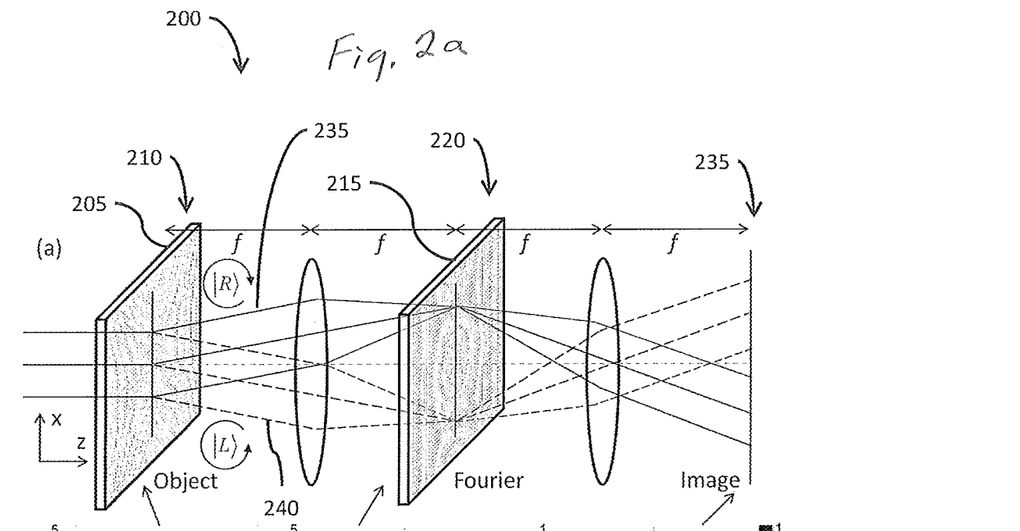
FIG. 2a shows the sorting device of the disclosed embodiments, implemented as a 4-f imaging system.

FIG. 2(a) shows the sorting device 200 of the disclosed embodiments, implemented as a 4-f imaging system with a transformation PBOE 205 placed on the object plane 210, and a phase correction PBOE 215 placed in the Fourier plane 220, and the sorted angular momentum eigenstates 225, 230 appearing in the image plane 235. In order to implement the correct mapping, the difference in the topological phase modulation for the two SAM states must be considered. The rays 235, 240 in FIG. 2a trace the paths in the xz-plane for the $|L\rangle$ (green) 235 and $|R\rangle$ (red) 240 SAM states of the incident beam. After transmission through each PBOE, these states are inverted ($|L\rangle \rightarrow |R\rangle$, $|R\rangle \rightarrow |L\rangle$), and their respective phase modulations have opposite signs. The term $x(\pi a/\lambda f)$ in Equation 1 represents the phase modulation of the transformation PBOE, which acts as a diffraction grating that couples $|L\rangle$ to the +1 and $|R\rangle$ to the −1 diffraction orders as disclosed by Nersisyan, S. R., Tabiryan, N. V., Steeves, D. M., & Kimball, B. R. (2010), "The Promise of Diffractive Waveplates", *OPN Optics & Photonics News* (March), 41-45.

Due to this term, the two SAM states are spatially separated in the Fourier plane allowing the phase correction PBOE to operate independently on each. This is accomplished via a piece-wise definition of $\alpha_2(x, y)$ in Equation 2. The length of the sorter assembly can additionally be decreased by modifying Equation 2 to be:

$$\alpha_2(x,y) = \frac{\pi}{\Lambda}x + \frac{\pi ab}{\lambda f}\begin{cases}(-1)\exp\left(-\frac{x}{a}\right)\cos\left(\frac{y}{a}\right) + \frac{(x^2+y^2)}{2ab}; & x \geq 0 \\ (+1)\exp\left(+\frac{x}{a}\right)\cos\left(\frac{y}{a}\right) - \frac{(x^2+y^2)}{2ab}; & x < 0\end{cases} \quad (3)$$

and removing the second lens from the 4-f system. In this case the sorted image is formed a distance f from the phase correction element. The results are identical to those presented.

Figure 2B:
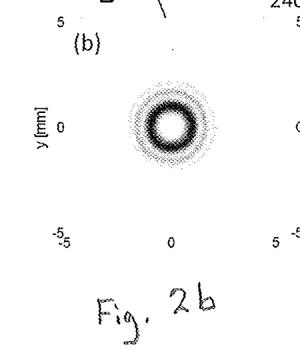
FIG. 2b shows an intensity profile at the input of the transformation PBOE for a Gaussian beam modulated by a topological phase factor.
Figures 2C, 2D:
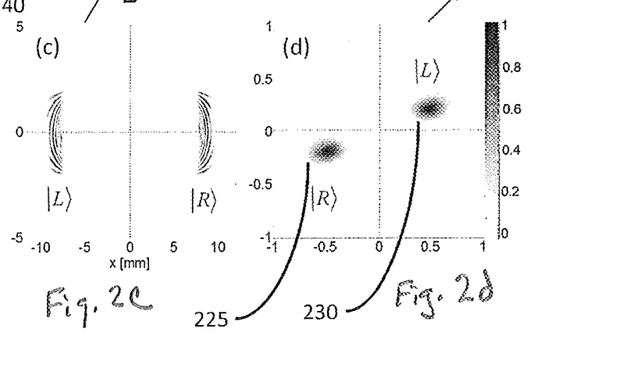
FIG. 2c shows the intensity profile of the beam at the Fourier plane where the phase correction PBOE is applied.
FIG. 2d shows the sorted OAM and SAM eigenstates of the beam according to the disclosed embodiments.

FIG. 2b shows the intensity profile at the input of the transformation PBOE for a Gaussian beam modulated by a topological phase factor exp (j2ϕ), giving it an OAM of +2$\hbar$. The phase factor is inscribed at the beam waist. The transformation element is located 500 mm from that point. The beam has a waist radius of $W_o$=5 mm, a wavelength of $\lambda$=1550 nm, and is linearly polarized. Notice the characteristic intensity null in the center of the beam resulting from the phase singularity. FIG. 2c shows the intensity profile of this beam at the Fourier plane where the phase correction PBOE is applied. The $|L\rangle$ SAM component appears in the −x side of the plane while the $|R\rangle$ component appears in the +x side. This allows the phase correction PBOE to modulate the two SAM eigenstates independently.

The role of the phase correction element is to compensate for phase distortions produced by the transformation element and is required for any non-conformal optical mapping (see, for example, Bryngdahl, O. (1974), Geometrical transformations in optics, *J. Opt. Soc. Am.*, 64(8), 1092-99). When defining the orientation function for the slow-axis of this element we must be careful to account properly for the inversion of the SAM states, and the discrepancy in the sign of the phase modulation. We account for these factors by defining $\alpha_2(x, y)$ in a piecewise fashion.

Finally, in order to spatially separate the SAM states in the sorted image, we superimpose the phase factor of a cycloidal PBOE on the phase correction element of the ring-to-point transformation by adding the term $x\pi/\Lambda$ in Equation 2, and Equation 3. This additional mapping does not require a separate phase correction. Adding this term doubles the available state space over an OAM only sorter by removing SAM degeneracy from the output. Without this term ($\pm 1\hbar, |L\rangle$) and ($\mp 1\hbar, |R\rangle$) would appear in the same location in the final image. FIG. 2d shows the sorted OAM and SAM eigenstates of this beam. $|L\rangle$ is focused onto the +x side of the image plane while $|R\rangle$ is focused onto the −x side. The focused spots are displaced in the y-direction by a distance determined by their OAM eigenstates in accordance with the ring-to-point geometric optical transform. For $|L\rangle$ the OAM displacement has the same sign as the topological charge while it has the opposite sign for $|R\rangle$. The intensity patterns in FIG. 2b-d were calculated using fast Fourier transforms to apply a diffraction operator $\hat{D}=(\frac{1}{2}jk_o)\nabla^2$ to the (x, y) components of the complex amplitude of the beam, to solve for the paraxial propagation between elements (see, for example, Poon, T.-C., & Kim, T. (2006), *Engineering Optics with MATLAB*, Hackensack, N.J.: World Scientific Publishing Co. Pte. Ltd.).

Transmission through each lens is calculated by multiplying by a transverse phase function:

$$E_{x,y}^+(x,y) = \exp(jk_o(x^2+y^2)/2f)E_{x,y}^-(x,y)$$

and through the transformation and phase correction PBOEs by applying the spatially varying rotation Jones matrix:

$$[E_x^+(x,y); E_y^+(x,y)] = M(x,y)[E_x^-(x,y); E_y^-(x,y)]$$

where f is the focal length of the lenses, $k_O$ is the wavenumber, and $E_{x,y}^-$ and $E_{x,y}^+$, are the field components of the beam as it enters, and exits each element. The parameters of this example of the sorter are $\alpha$=1.3 mm, b=1, $\Lambda$=1.78 mm, and f=500 mm. The focal length was chosen to reduce computational memory requirements when working in both the direct space and Fourier domains, but this value can be significantly reduced.

Figure 3A:
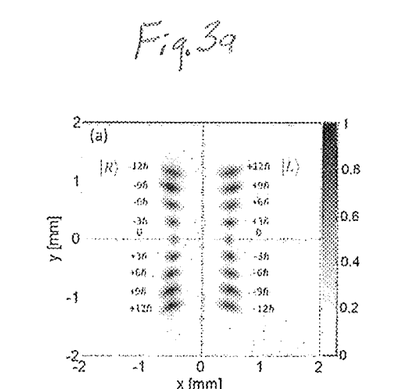
FIGS. 3a and 3b illustrate the angular momentum sorting behavor of the sorting device of the disclosed embodiments for Gaussian beams modulated with varying topological charge.
Figure 3B:
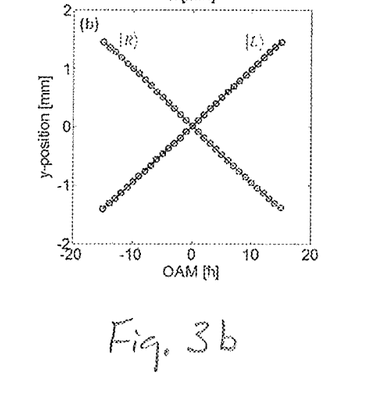

FIGS. 3a and 3b illustrate the angular momentum sorting behavior of this device for Gaussian beams modulated with varying topological charge. FIG. 3a shows a superposition of the intensity profiles in the output plane, for incident beams with discrete OAM values between −12$\hbar$ to 12$\hbar$, for both SAM eigenstates. In a quantum OAM communication system, the number of states in the figure could encode a channel capacity of approximately 4.17 bits per photon. The step of 3$\hbar$ was chosen to decrease overlap between the focused points. FIG. 3b shows the y-positions of each sorted OAM state from −16$\hbar$ to 16$\hbar$. Notice that the spacing of these values are linear. However, the focused spots of the sorter output significantly overlap for this OAM spacing. If these individual states can be discriminated they could encode 6 bits per photon. The ability of these ultra-thin elements to uniquely identify a large number of OAM and both SAM eigenstates in a single measurement suggests the impact that PBOEs could have in highbandwidth communication and encryption systems.

The focused spots in the output plane of the sorter overlap, making it difficult to identify the correct OAM eigenstate. O'Sullivan et. al, (O'Sullivan, M. N., Mirhosseini, M., Malik, M., & Boyd, R. W. (2012), Near-perfect sorting of orbital angular momentum and angular position states of light, *Opt. Express*, 20(22), 24444-9) developed a solution to this problem in which, multiple coherent copies of the sorter output are made by holographic refractive beam copying then interfered with each other in a manner that reduces the size of the focused spots. This nonconformal mapping requires an additional 4-f imaging system following the sorter, Mirhosseini et. al. (Mirhosseini, M., Malik, M., Shi, Z., & Boyd, R. W. (2013), Efficient separation of the orbital angular momentum eigenstates of light. *Nat. Comm.*, 4, 2781) used spatial light modulators (SLMs) to implement these elements. In the disclosed embodiments, two PBOEs can be used to implement the refractive copying transform. The first refractive copying PBOE, known as the fan-out element, is placed in the image plane of FIG. 2(a), and has a slow-axis orientation pattern of:

$$\alpha_3(x, y) = \frac{1}{2}\tan^{-1}\left(\frac{\sum_{m=-N}^{N} \gamma_m \sin(k_o smy + \alpha_m)}{\sum_{m=-N}^{N} \gamma_m \cos(k_o smy + \alpha_m)}\right) \quad (4)$$

where s is the angular separation between each copy of the beam, and 2N+1 are the number of copies. $\gamma_m$ and $\alpha_m$ are the relative phase and amplitude of the copies. In this example, we use the optimized parameters for 7 copies reported in the supplementary material of Mirhosseini et al. referred to above. The slow-axis orientation pattern of the phase correction PBOE is designed to compensate for the difference in optical path length between the copies.

Figure 4A:
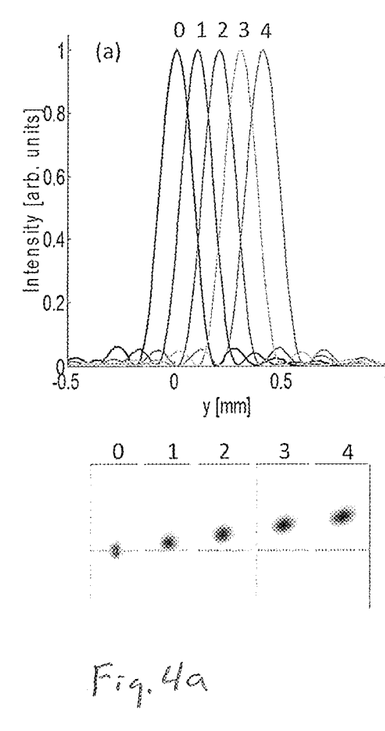
FIGS. 4a and 4b illustrate the effects of a refractive copying element on the separation of the sorted OAM eigenstates.
Figure 4B:
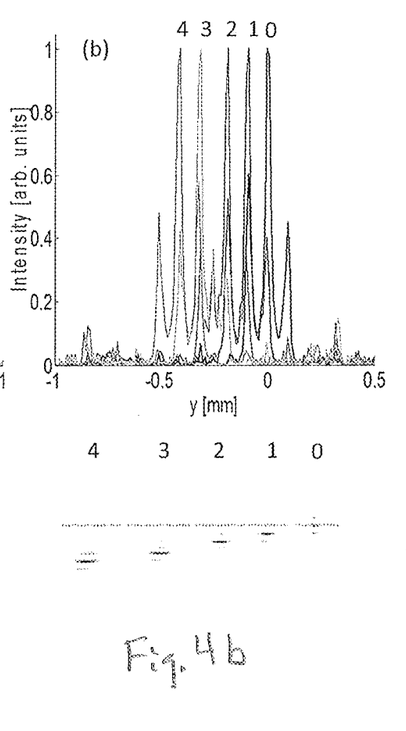

FIGS. 4a and 4b illustrate the effects of the refractive copying element on the separation of the sorted OAM eigenstates. FIG. 4a shows the intensity cross-section along the y-direction of sorted OAM eigenstates with topological charge between 0 and 4. Adjacent curves overlap around 80% of their maxima. FIG. 4b shows the same sorted OAM states after being separated by refractive beam copying. The linewidth of each curve is greatly reduced, so that each state may be determined from the output. Note that after the refractive beam copying the focused spots of the sorter output are flipped about both the x- and y-axes.

Pertinent Examples of Operation

In the description of the disclosed embodiments, we considered the sorting functionality for zero-order Gaussian beams modulated by helical phase factors. This type of OAM carrying beam is the type generated by a q-plate as disclosed by Marrucci et al., referred to above. Alternatively, laser and fiber modes carrying OAM can also be switched at high rates for use in data transmission, as disclosed by Ramachadran, S., & Kristensen, P. (2013), Optical vortices in fiber, *Nanophotonics*, 2(5-6), 455-74.

Figure 5A:
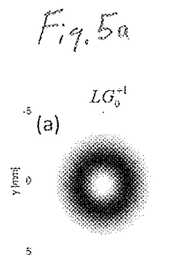
Figures 5A, 5A:
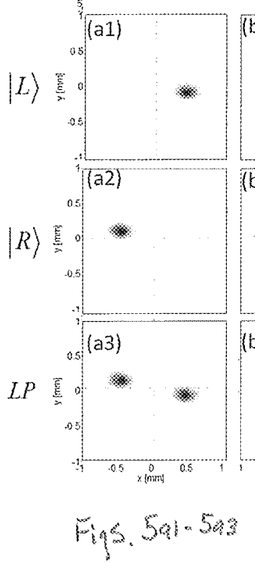
Figure 5B:
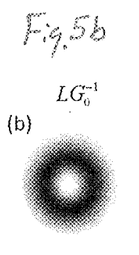

A particularly important set of cavity modes are the Laguerre-Gaussian modes, which are a solution to the paraxial Helmholtz equation, and are a complete set of OAM eigenmodes (see, for example, Saleh, B. E., & Teich, M. C. (2007), *Fundamentals of Photonics Second Edition*, Hoboken, N.J.: John Wiley & Sons, Inc.). A Laguerre-Gaussian mode is denoted $LG_m^l$, where l is the topological charge and can be any integer, while m is an integer$\geq 0$. The intensity profile of the $LG_0^{+1}$, and $LG_0^{-1}$ modes are shown in FIGS. 5a and b, respectively, for $W_o$=5 mm. These intensity profiles are identical, and therefore the sign of the topological charge cannot be determined without an additional phase measurement.

The two SAM eigenstates of a Laguerre-Gaussian mode are defined as:

$$|L\rangle = LG_m^l \hat{x} + jLG_m^l \hat{y}, \text{ and } |R\rangle = LG_m^l \hat{x} - jLG_m^l \hat{y}$$

For the $LG_0^{+1}$ and $LG_0^{-1}$ modes, the outputs of the proposed sorting device are shown in FIGS. 5a1 and 5b1 for $|L\rangle$, and FIGS. 5a2 and 5b2 for $|R\rangle$. Although the intensity profile of the four input beams are identical, one non-destructive measurement using the proposed sorter can simultaneously determine both the OAM and SAM eigenstate.

Figures 5B, 5B, 5C, 5C:
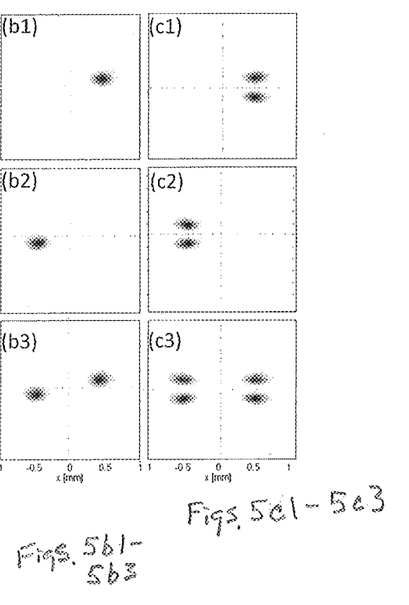

The sorter can also determine if the beam is in a mixed SAM state such as linear or elliptical polarization. FIGS. 5a3 and 5b3 show the sorting results for one such linearly polarized state, $LP=LG_m^l \hat{x}+LG_m^l \hat{y}$, for l=+1 and -1 respectively. The input intensity profiles are identical to those of the four eigenstate pairs. However, since the mixed SAM states are superpositions of the $|L\rangle$ and $|R\rangle$, the output of the sorter shows the relative intensity of each component. By measuring the intensity difference between the spots on either sides of the y-axis, the contribution of each SAM eigenstate to the total field can be determined. However, this measurement will not determine the phase difference between the modes. For example, the results for all linearly polarized $LG_0^{+1}$ and $LG_0^{-1}$ modes will be identical to FIGS. 5a3 and 5b3, respectively, no matter the polarization angle.

Figure 5C:
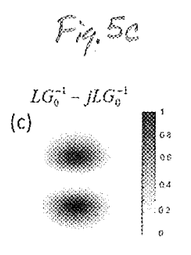

Another important set of cavity modes are the Hermite-Gaussian modes, denoted $HG_{pq}$ where p and q are integers (see, for example, Saleh et al. mentioned above). Any $HG_{pq}$ mode can be reconstructed from a linear superposition of phase delayed $LG_m^l$ modes (Padgett & Courtial, 1999). An example of this is illustrated in FIG. 5c, which shows the intensity of the mode $HG_{01}=LG_0^{+1}-LG_0^{-1}$. As was the case for the pure Laguerre-Gaussian eigenmodes, these mixed OAM modes can exist in any SAM state. FIGS. 5c1 and 5c2 show the output of the sorter for the $HG_{01}$ mode in $|L\rangle$ and $|R\rangle$, respectively. The two focused spots in each figure correspond to the $+1\hbar$ and $-1\hbar$ OAM eigenstates. Since these spots appear on one side of the image plane in the x-direction, only one SAM eigenstate is present in each. Analogous to the measurement of the contribution of each SAM eigenstate, the fraction of each $LG_m^l$ OAM eigenmode but not their phase difference can be determined by measuring the relative intensity of the spots on either side of the x-axis. An equivalent interpretation of this result is that this measurement will determine the phase difference between the $HG_{pq}$ and $HG_{qp}$ modes but not their fractional contribution to the field. FIG. 5c3 shows the output for a linearly polarized version of this Hermite-Gaussian mode. In this case all four first order OAM and SAM eigenstates are present. Once more, the sorter can only determine the relative contribution of each eigenstate, and not the phase delay between either the OAM or SAM components. In fact, for all linearly polarized first order Hermite-Gaussian modes the sorter output will be identical to FIG. 5c3 no matter the polarization or rotation angle. FIGS. 5a3 and 5b3 show that the sorter can determine that there are even parts of each of the two SAM states for a linearly polarized input.

Figure 6A:
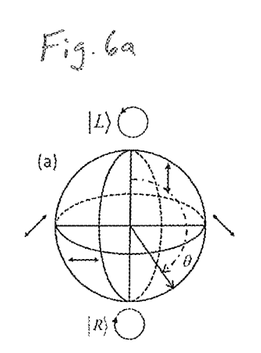
FIGS. 6a and 6c illustrate Poincaré-spheres for visualizing mixed SAM states and mixed OAM states, respectively.
Figure 6B:
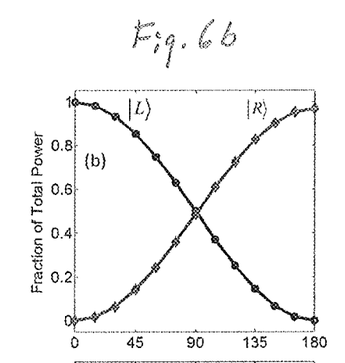
FIGS. 6b and 6d show a fraction of total output power as a function of the elevation angle on the respective Poincaré-sphere.

It should be understood that the disclosed embodiments may also be used to analyze the relative contribution of the SAM states for any elliptical state of polarization. FIG. 6a illustrates the concept of mixed SAM states. The Poincaré-sphere is a tool for visualizing pure states of polarization. The SAM eigenstates are represented by the north and south poles and the equator depicts all possible linear polarization states. The s and p linear polarization states are at the front and rear of the equator. The elevation angle determines the relative contribution of the two eigenstates and the azimuth indicates the phase delay between them. States not on the equator or at the poles are elliptically polarized. Monitoring the relative intensity of the focused spots on either side of the y-axis of the PBOE angular momentum sorter output will determine the elevation angle but not the azimuth. That is, it finds the relative magnitude of each eigenstate but not their phase difference. In fact for all mixed states of a particular $LG_m^l$ mode with the same elevation angle, the sorter will give identical results. We define the complex amplitude of a mixed SAM state Laguerre-Gaussian mode as, $$\begin{bmatrix} U_x \\ U_y \end{bmatrix} = \begin{bmatrix} LG_m^l \\ LG_m^l \exp(j(\theta + \frac{\pi}{2})) \end{bmatrix} \quad (5)$$

where $\theta$ is the elevation angle in FIG. 6a. For the l=+1, m=0 modes, the sorter output for the OAM and SAM eigenstates are shown in FIGS. 5a1 and 5a2. FIG. 6b shows the fraction of total output power in each of these two spots as a function of $\theta$. The two curves have a sinusoidal shape. Using these curves, the elevation angle on the Poincaré-sphere of an elliptically polarized beam may be experimentally determined.

Figure 6C:
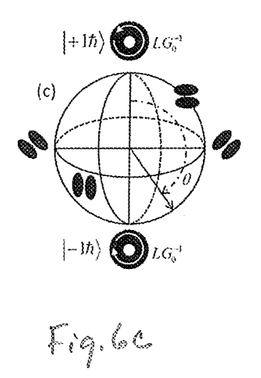
Figure 6D:
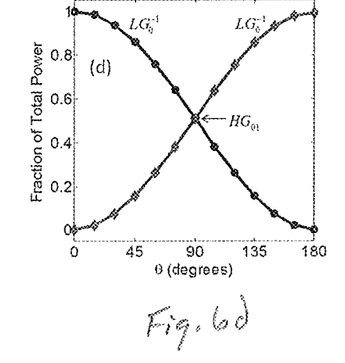

The same technique can also be used to measure the relative contribution of each OAM eigenstate to the total field. FIG. 6c shows the equivilent Poincaré-sphere for visualizing the OAM components of these modes (see, for example, Padgett, M. J., & Courtial, J. (1999), Poincare-sphere equivalent for light beams containing orbital angular momentum, *Optics Lett.*, 24(7), 430-432). This sphere specifically illustrates the mixing of the l=±1 OAM eigenstates. In this representation a separate equivalent Poincaré-sphere exists for each pair l=±Q, where Q is an integer >0. Similar to the Poincaré-sphere, the poles represent the eigenmodes, which in this case are $LG_0^{+1}$ and $LG_0^{-1}$. The equator depicts all possible equal intensity linear combinations of $LG_0^{-1}$ and $LG_0^{-1}$, or equivalently all equal phase linear combinations of $HG_{10}$ and $HG_{01}$. We define the complex amplitude of a mixed OAM state Laguerre-Gaussian mode as $$\begin{bmatrix} U_x \\ U_y \end{bmatrix} = \begin{bmatrix} LG_m^{+|l|}\cos(\frac{\theta}{2}) - LG_m^{-|l|}\sin(\frac{\theta}{2}) \\ jLG_m^{+|l|}\cos(\frac{\theta}{2}) - jLG_m^{-|l|}\sin(\frac{\theta}{2}) \end{bmatrix} \quad (6)$$

where $\theta$ is the elevation angle in FIG. 6c. For m=0, the sorter output for the l=+1 and l=−1 eigenmodes are shown in FIGS. 5a1 and 5b2 for $|L\rangle$. FIG. 6d shows the fraction of total output power in each of these two spots as a function of the elevation angle on the equivalent Poincaré-sphere. The two curves are identical to those in FIG. 6b. We can therefore use the same method to measure the relative contribution of each OAM eigenmode to the total field.

Figure 7A:
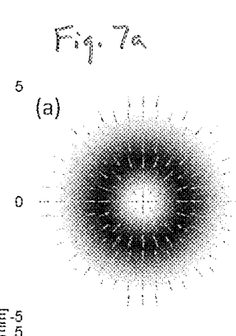
FIGS. 7a and 7b show intensity and polarization patterns of radially polarized transvers magnetic and azimuthally polarized transvers electric doughnut modes, respectively.
Figure 7B:
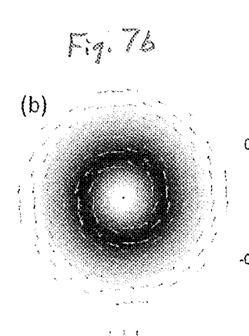
Figure 7C:
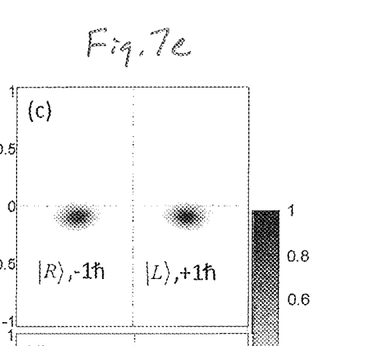
FIGS. 7c and 7f show outputs of the disclosed sorter for the transves magnetic/transvers electric, and hybrid electric odd/hybrid electric even doughnut modes, respectively.
Figure 7D:
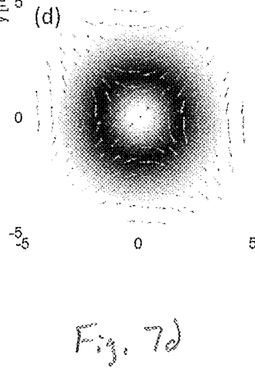
FIGS. 7d and 7e show intensity and polarization patterns of hybrid electric odd and hybrid electric even doughnut modes, respectively.
Figure 7E:
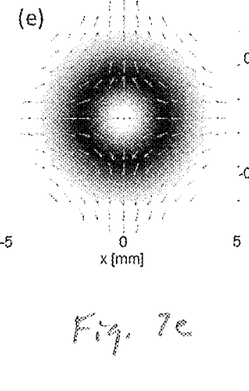
Figure 7F:
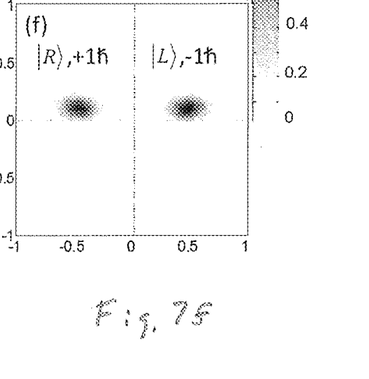

For the disclosed embodiments to be an effective tool for high bandwidth communication systems, this analysis must be expanded to include higher order and hybrid modes which possess a more complex combination of SAM and OAM eigenstates. A common example of hybrid modes are the radially polarized transverse magnetic $TM_{01}=\pm[HG_{10}; HG_{01}]$, and azimuthally polarized transverse electric $TE_{01}=\pm$ $[HG_{01}; -HG_{10}]$ vector modes as disclosed by Novotny, L., & Hecht, B. (2006), *Principles of Nano-Optics*, Cambridge, UK: Cambridge University Press. These can be constructed from the superposition of two Laguerre-Gaussian eigenmodes, one in each SAM eigenstate, and have the same structured polarization patterns as two of the four first order fiber optics eigenmodes (Golowich et. al.). However, unlike the Hermite-Gaussian modes, the component Laguerre-Gaussian modes are in opposite OAM eigenstates, and are rotated from one another by 90°. This gives them intensity patterns identical to the pure Laguerre-Gaussian OAM eigenmodes, but with more complex angular momentum structure, which is evidenced in their nonuniform polarization patterns (Andrews, 2008). FIGS. 7(a) and 7(b) show the intensity and polarization patterns of the $TM_{01}$, and $TE_{01}$ vector modes, respectively. The intensity patterns are normalized to their own maximum, and the local polarization directions are depicted by the arrows. Notice that these beams have identical intensity patterns to the $LG_0^{\pm 1}$ modes in FIGS. 5(a) and 5(b); however, their polarization differs from the trivial circular, linear, and elliptical states of the pure eigenmodes. The electric field vectors of these hybrid modes are linearly polarized in a direction that varies transversely across the beam. Note that despite the central null in the beam intensity these vector modes have no net OAM, similar to the Hermite-Gaussian modes. That is, they are equal parts ±1$\hbar$ with the same probability of measuring either eigenvalue. This can be seen in FIG. 7(c) which shows the output of the sorter for both the $TM_{01}$ and $TE_{01}$ vector modes. Notice that the eigenstate composition of both of these structured beams is equal magnitude ($|L\rangle$ , $LG_0^{+1}$) and ($|R\rangle$ , $LG_0^{-1}$). This can be verified by comparing these results to the definitions. The sorter cannot determine the difference between these modes since they have the same eigenstate composition. However, two other vector modes exist with the same polarization structure as the two remaining first order fiber optic eigenmodes, specifically, hybrid electric odd $HE_{21o}=\pm[HG_{01}; HG_{10}]$, and hybrid electric even $HE_{21e}=\pm[HG_{10}; -HG_{01}]$. FIGS. 7(d) and 7(e) show the intensity and polarization patterns of the $HE_{21o}$, and $HE_{21e}$ vector modes, respectively. FIG. 7(f) shows the sorter output for both of these beams. It now becomes clear that the angular momentum eigenstate pairs of the $HE_{21o}$, and $HE_{21e}$ vector modes are ($|L\rangle$ , $LG_0^{-1}$) and ($|R\rangle$ , $LG_0^{+1}$), the opposite of $TM_{01}$ and $TE_{01}$.

Therefore, in a single measurement the disclosed embodiments may decompose the angular momentum eigenmode components of structured polarization hybrid beams, which cannot be simultaneously measured using other methods. For example, an OAM only sorter would not be able to distinguish the ring vector beams from a Hermite-Gaussian beam without making an additional measurement of the intensity pattern. In any case, it could not distinguish $TM_{01}$/$TE_{01}$ from $HE_{21o}$/$HE_{21e}$ as they all have equal parts ±1$\hbar$ OAM. The structured polarization pattern could be measured directly by taking a series of images of the intensity pattern through a linear polarizer rotated at various angles (see, for example, Ramachadran et al. mentioned above). The required resolution of the rotation angle will increase with the OAM eigenvalue. Recently, vector mode demultiplexing of all four vortex ring modes was demonstrated using a beam splitter and two q-plates of opposite sign charge to transform $TM_{01}$/$HE_{21e}$, and $TE_{01}$/$HE_{21o}$ to s and p polarized zero order beams (Milione et al. "4×20 Gbit/s mode division multiplexing over free space using vector modes and a q-plate mode (de)multiplexer," Optics Letters 40(9), 1980-1983 (2015)). This allows for the simultaneous complete discrimination of the first order fiber vector modes but would be impractical to scale up since the number of elements and the insertion losses will increase linearly with the number of modes. Finally, a holographic interferometric method could be used, where the beam is combined with a reference, and a numerical image processing method decomposes the interference pattern into component Bessel beams (Lawrence, Trevino, & Dal Negro, 2012). None of these alternative methods possess the ability of the PBOE angular momentum sorter to characterize the eigenmode composition of a structured optical beam in a single intensity measurement without the need for interferometers and numerical image processing. The ability of the proposed device to fully discriminate the angular momentum eigenstates of hybrid modes is evidence of its versatility. The result that the device can operate for complex polarization structures indicates that the angular momentum eigenstates of any hybrid mode can be determined. This provides a vast available state space for communication systems. For example, with both SAM, and only two OAM eigenstates, there are 16 unique outputs which can encode 4 bits in a many photon non-quantum scheme. Adding the zero order Gaussian mode increases the capacity to 6 bits. All that is needed is the ability to form any linear combination of the $LG_0^{\pm 1}$ eigenmodes. This can be accomplished in cavities, free space, and fibers.

Figure 8A:
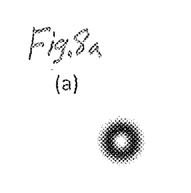
FIGS. 8a-8c show intensity profiles for different Laguerre-Gaussian modes according to the disclosed embodiments.
Figure 8B:
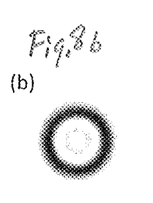
Figure 8C:
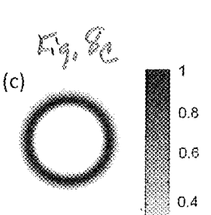
Figure 8D:
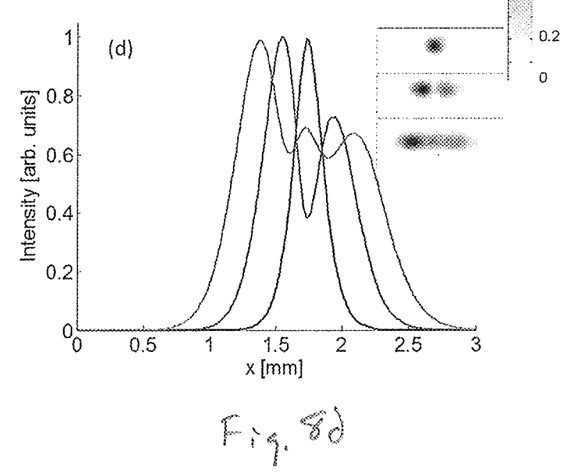
FIG. 8d shows an intensity profile for an output of an embodiment of the sorter.

Another important class of higher order modes are $LG_m^l$ for m>0. Similar to the m=0 $LG_m^l$ modes, these exist in single OAM eigenstates, but have larger cross-sections that include series of concentric rings in intensity. Despite the OAM degeneracy of these modes, they also can be distinguished by the disclosed embodiments. FIGS. 8a-8c show the intensity profile of the $LG_m^{+1}$ modes for m=0, 1, and 2, respectively. Other than m all beam parameters are identical to those of the Laguerre-Gaussian modes discussed earlier, the intensity of each image is normalized to its own maximum. Notice that each mode pattern includes m+1 concentric rings. FIG. 8d shows the intensity profile along the x-direction of the output of the sorter at the y-offset associated with the l=+1 OAM eigenstate. Each of the cross-sections (m=0 blue, m=1 red, and m=2 green) is normalized to its own maximum. The inset shows the two-dimensional intensity maps of each of these outputs. Notice that there are N=m+1 intensity spots displaced in the x-direction of the sorted image, which is perpendicular to the off-sets produced by the OAM sorting operation. Importantly, the displacement in the y-direction does not change with m since this parameter does not alter the OAM eigenstate of the higher order Laguerre-Gaussian modes. This dual functionality gives the disclosed embodiments additional ability to evaluate the modal composition of laser cavities and fibers.

An example implementation including a range of functionalities of the disclosed embodiments, that is discrimination of OAM, SAM, the m parameter, and determination of the relative contribution of each cavity eigenmode, is also disclosed. FIGS. 9a1, 9a2, 9b1, 9b2, 9c1, 9c2, 9d1, and 9d2 show several complex structured beams composed of a superposition of Laguerre-Gaussian modes with l=−3, +1, and +5 for $|R\rangle$, and l=+3, −1, and −5 for $|R\rangle$. In each the l=±1 modes contribute twice the power to the total field as the other modes, and the $|L\rangle$, and $|R\rangle$ modes are rotated from each other by 90°.

Figures 9A, 9A:
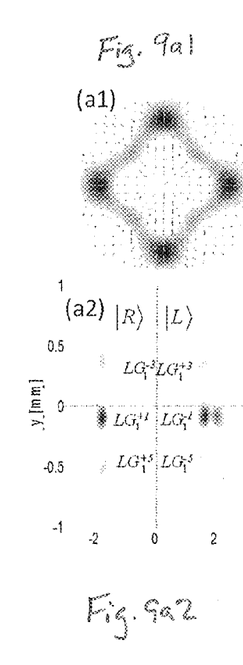
Figures 9B, 9B:
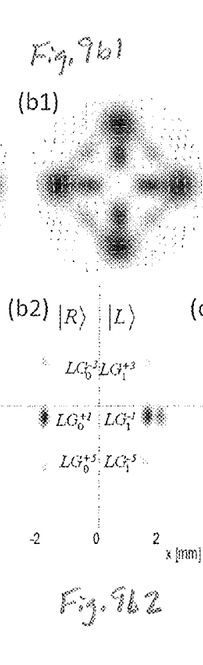
Figures 9C, 9C, 9D, 9D:
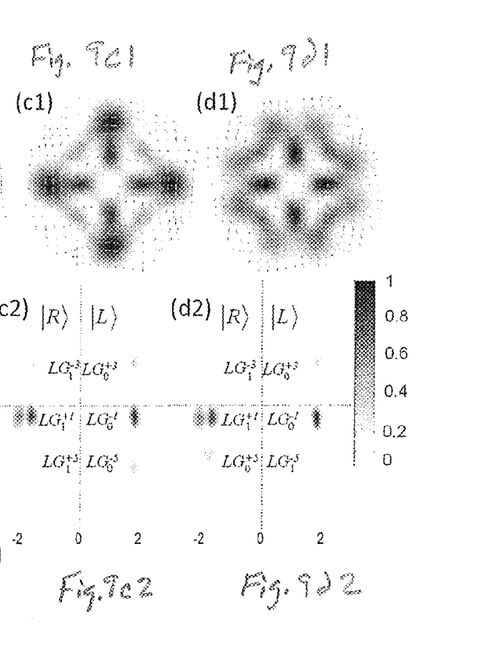

In FIG. 9a1, the parameter m=1 for all the component modes. The intensity pattern is normalized to its own maximum, and the local polarization direction is depicted by the arrows. FIG. 9a2 shows the sorter output for this structured field. Each of the Laguerre-Gaussian cavity mode components of the field are uniquely identified by the sorter. Notice that there are two focal spots for each OAM, SAM pair indicating that the m parameter of the eigenmodes is 1. FIGS. 9b1, and 9c1 show the structured beam where m has been changed to 0 for $|R\rangle$, and $|L\rangle$, respectively. Notice that the intensity cross-sections of these beams are identical and that their structured polarization patterns are nearly the same, the only difference being that they are a half-wave out of phase. This subtle difference is detected by the disclosed embodiments, as can be seen by comparing FIGS. 9b2, and 9c2, which show the outputs for these beams. Finally, FIG. 9d1 shows a beam where both the $|R\rangle$, and $|L\rangle$ polarizations have m=0, and 1 components. FIG. 9d2 shows the sorter output for this beam. Once again, each eigenmode is fully separated and identifiable. These results demonstrate the breath of available state space in which spatially structured information can be decoded by the PBOE angular momentum sorter.

The sorting results presented in this section demonstrate that the proposed PBOE device can decompose the OAM and SAM eigenstates of a complex mixed mode optical beam. We additionally showed that this device can determine the integer index m of a Laguerre-Gaussian mode even though this parameter is unrelated to the angular momentum of the beam. These capabilities could enable the readout of information encoded in the topological phase and intensity spatial cross-section of a structured optical beam. Furthermore, the device could be used to determine the modal composition of the output of laser cavities and fiber optics by identifying the relative magnitude of each Laguerre-Gaussian eigenmode including both SAM states.

High rate optical communications with data transmission rates on the order of 100 Tbit/s have recently been demonstrated by encoding information in OAM. The disclosed embodiments may be applied for use in fiber optic and freespace communications systems. The embodiments disclosed herein may also be implemented for use with instruments such as ellipsometers which are used in the semiconductor and MEMS industry to measure the thickness, refractive index, and roughness of thin films. Also polarimeters used in laser radar systems, wavefront sensors which are used to measure eye aberration for laser vision correction surgery, fiber optic and laser cavity mode characterization tools, optical tagging systems, and optical instruments for the full characterization of the angular momentum eigenstate vector.

The ability to manipulate the Pancharatnam phase of optical waves opens possibilities to control light in new ways, on size scales previously unobtainable, and with near perfect diffraction efficiencies. The disclosed embodiments include a PBOE angular momentum sorting device applicable to various system including communications systems and scientific measurement techniques. The sorting device has the ability to sort simultaneously the OAM and SAM eigenstates of an optical beam in a single measurement, enabling the ability to characterize the modal composition of structured optical beams without the need for numerical decomposition or interferometry.

A two-dimensional spatially varying rotation angle of the slow axis in an anisotropic material or structure has been defined that implements two PBOEs used to generate an azimuth to linear phase geometric optical transform that simultaneously sorts the OAM and SAM eigenstates of an optical beam. The circular polarization selective nature of PBOEs enables full characterization of the angular momentum eigenstates of a beam as opposed to previous OAM only methods. This enables the ability to determine in a single measurement, the eigenmode composition of structured beams resulting from hybrid mode combinations. In addition, since the azimuthal to linear phase geometric transformation is implemented with a ring-to-point coordinate mapping, the device can additionally determine the m parameter of a $LG_m^l$ Laguerre-Gaussian modes. Since these and similar beams can be generated and modulated with specialty optics, laser cavities, and fiber optics, the disclosed embodiments demonstrate the importance that such a PBOE device could have for future angular momentum based optical communication systems.

Thus, while there have been shown, described and pointed out, fundamental novel features as applied to the exemplary embodiments thereof, it will be understood that various omissions and substitutions and changes in the form and details of devices and methods illustrated, and in their operation, may be made by those skilled in the art without departing from the spirit of the disclosed embodiments. Moreover, it is expressly intended that all combinations of those elements and/or method steps, which perform substantially the same function in substantially the same way to achieve the same results, are within the scope of the disclosed embodiments.

Moreover, it should be recognized that structures and/or elements and/or method steps shown and/or described in connection with any disclosed form or embodiment of the disclosed embodiments may be incorporated in any other disclosed or described or suggested form or embodiment as a general matter of design choice. Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure. It is the intention, therefore, to be limited only as indicated by the scope of the claims appended hereto.

The invention claimed is:

1. An apparatus for sorting orbital angular momentum eigenstates of one or more photons, comprising:
at least one transformation Pancharatnam-Berry Optical Element (PBOE) and at least one phase correction PBOE configured to sort at least the orbital angular momentum eigenstates of the one or more photons;
wherein one or more of the transformation PBOE and phase correction PBOE are configured to sort spin angular momentum eigenstates of the one or more photons.

2. The apparatus of claim 1, wherein the one or more photons comprise an optical beam.

3. The apparatus of claim 1, wherein the at least one transformation PBOE and the at least one phase correction PBOE comprise an anisotropic thin film element.

4. The apparatus of claim 1, wherein the transformation and phase correction PBOEs have complementary slow-axis orientation patterns that together form a ring to point geometric optical transformation that sorts the angular momentum eigenstates of the one or more photons.

5. The apparatus of claim 1, wherein the at least one transformation PBOE comprises a first transversely varying slow-axis orientation pattern.

6. The apparatus of claim 5, wherein the first transversely varying slow-axis orientation pattern is implemented using the function:

$$\alpha_1(x,y) = \frac{\pi a}{\lambda f}\left(y\tan^{-1}\left(\frac{y}{x}\right) - x\ln\left(\frac{\sqrt{x^2+y^2}}{b}\right) + x\right),$$

where f is the focal length of lenses in the 4-f imaging system.

7. The apparatus of claim 1, wherein the at least one phase correction PBOE comprises a second transversely varying slow-axis orientation pattern.

8. The apparatus of claim 7, wherein the second transversely varying slow-axis orientation pattern is implemented using the function:

$$\alpha_2(x,y) = \frac{\pi}{\Lambda}x + \frac{\pi ab}{\lambda f}\begin{cases}(-1)\exp\left(-\frac{x}{a}\right)\cos\left(\frac{y}{a}\right); & x \geq 0 \\ (+1)\exp\left(+\frac{x}{a}\right)\cos\left(\frac{y}{a}\right); & x < 0\end{cases}$$

where f is the focal length of the lenses in the 4-f imaging system, and $\Lambda$ determines the spacing between the sorted SAM eigenstates.

9. The apparatus of claim 7, wherein the second transversely varying slow-axis orientation pattern is implemented using the function:

$$\alpha_2(x,y) = \frac{\pi}{\Lambda}x + \frac{\pi ab}{\lambda f}\begin{cases}(-1)\exp\left(-\frac{x}{a}\right)\cos\left(\frac{y}{a}\right) + \frac{(x^2+y^2)}{2ab}; & x \geq 0 \\ (+1)\exp\left(+\frac{x}{a}\right)\cos\left(\frac{y}{a}\right) - \frac{(x^2+y^2)}{2ab}; & x < 0\end{cases}$$

where f is the focal length of the lenses in the 4-f imaging system, and $\Lambda$ determines the spacing between the sorted SAM eigenstates.

10. The apparatus of claim 1, where in the at least one transformation PBOE and the at least one phase correction PBOE are arranged as a 4-f imaging system with:
the at least one transformation Pancharatnam-Berry Optical Element (PBOE) positioned in an object plane of the imaging system;
the at least one phase correction PBOE positioned in a Fourier plane of the imaging system, and
the sorted angular momentum eigenstates of the one or more photons appear in an image plane of the imaging system.

11. A method for sorting orbital angular momentum eigenstates of one or more photons, comprising:
using at least one transformation Pancharatnam-Berry Optical Element (PBOE) and at least one phase correction PBOE to sort at least the orbital angular momentum eigenstates of the one or more photons; and
using one or more of the transformation PBOE and phase correction PBOE to sort spin angular momentum eigenstates of the one or more photons.

12. The method of claim 11, wherein the one or more photons comprise an optical beam.

13. The method of claim 11, wherein the at least one transformation PBOE and the at least one phase correction PBOE comprise an anisotropic thin film element.

14. The method of claim 11, wherein complementary slow-axis orientation patterns of the transformation and phase correction PBOEs together form a ring to point geometric optical transformation that sorts the angular momentum eigenstates of the one or more photons.

15. The method of claim 11, wherein the at least one transformation PBOE comprises a first transversely varying slow-axis orientation pattern.

16. The method of claim 15, comprising implementing the first transversely varying slow-axis orientation pattern using the function:

$$\alpha_1(x, y) = \frac{\pi a}{\lambda f}\left(y\tan^{-1}\left(\frac{y}{x}\right) - x\ln\left(\frac{\sqrt{x^2+y^2}}{b}\right) + x\right),$$

where f is the focal length of lenses in the 4-f imaging system.

17. The method of claim 11, wherein the at least one phase correction PBOE comprises a second transversely varying slow-axis orientation pattern.

18. The method of claim 17, comprising implementing the second transversely varying slow-axis orientation pattern using the function:

$$\alpha_2(x, y) = \frac{\pi}{\Lambda}x + \frac{\pi ab}{\lambda f}\begin{cases}(-1)\exp\left(-\frac{x}{a}\right)\cos\left(\frac{y}{a}\right); & x \geq 0 \\ (+1)\exp\left(+\frac{x}{a}\right)\cos\left(\frac{y}{a}\right); & x < 0\end{cases}$$

where f is the focal length of the lenses in the 4-f imaging system, and $\Lambda$ determines the spacing between the sorted SAM eigenstates.

19. The method of claim 17, comprising implementing the second transversely varying slow-axis orientation pattern using the function:

$$\alpha_2(x, y) = \frac{\pi}{\Lambda}x + \frac{\pi ab}{\lambda f}\begin{cases}(-1)\exp\left(-\frac{x}{a}\right)\cos\left(\frac{y}{a}\right) + \frac{(x^2+y^2)}{2ab}; & x \geq 0 \\ (+1)\exp\left(+\frac{x}{a}\right)\cos\left(\frac{y}{a}\right) - \frac{(x^2+y^2)}{2ab}; & x < 0\end{cases}$$

where f is the focal length of the lenses in the 4-f imaging system, and $\Lambda$ determines the spacing between the sorted SAM eigenstates.

20. The method of claim 11, comprising arranging the at least one transformation PBOE and the at least one phase correction PBOE as a 4-f imaging system by:

positioning the at least one transformation Pancharatnam-Berry Optical Element (PBOE) in an object plane of the imaging system;

positioning the at least one phase correction PBOE in a Fourier plane of the imaging system, and projecting the sorted angular momentum eigenstates of the one or more photons in an image plane of the imaging system.

\* \* \* \* \*